(12) United States Patent
Beeren

(10) Patent No.: US 7,242,109 B2
(45) Date of Patent: Jul. 10, 2007

(54) BUS SYSTEM FOR AN AGRICULTURAL VEHICLE

(75) Inventor: Joseph M. H. Beeren, Horst (NL)

(73) Assignee: John Deere Fabriek Horst B.V., Horst (NL)

(*) Notice: Subject to any disclaimer, the term of this patent is extended or adjusted under 35 U.S.C. 154(b) by 408 days.

(21) Appl. No.: 10/416,982

(22) PCT Filed: Nov. 28, 2001

(86) PCT No.: PCT/EP01/13903

§ 371 (c)(1),
(2), (4) Date: May 15, 2003

(87) PCT Pub. No.: WO02/45350

PCT Pub. Date: Jun. 6, 2002

(65) Prior Publication Data

US 2004/0027000 A1 Feb. 12, 2004

(30) Foreign Application Priority Data

Nov. 30, 2000 (DE) .............................. 100 59 601

(51) Int. Cl.
*B60L 1/00* (2006.01)
(52) U.S. Cl. .................. 307/9.1; 307/116; 710/300
(58) Field of Classification Search ............... 307/9.1, 307/125, 147, 116; 710/300
See application file for complete search history.

(56) References Cited

U.S. PATENT DOCUMENTS

| 5,517,065 A | * | 5/1996 | Kover, Jr. ................. 307/10.8 |
| 5,748,910 A |   | 5/1998 | Herrera E. .................. 395/281 |
| 6,230,089 B1 | * | 5/2001 | Lonn et al. ................... 701/48 |
| 6,351,828 B1 | * | 2/2002 | Frimodig et al. ............. 714/43 |
| 6,469,404 B1 | * | 10/2002 | Pohjola ..................... 307/10.1 |
| 2003/0090152 A1 | * | 5/2003 | Juntunen et al. .......... 307/10.1 |

FOREIGN PATENT DOCUMENTS

| DE | 198 33 462 | 1/2000 |
| EP | 10 52 760 | 5/2000 |
| WO | WO 94/07 318 | 9/1993 |
| WO | WO 98/35 857 | 2/1998 |

* cited by examiner

Primary Examiner—Chau N. Nguyen
Assistant Examiner—Daniel Cavallari

(57) ABSTRACT

The invention relates to a bus system comprising a bus line, to which electronic devices (26–36) can be connected. According to the invention, at least one electronic device (36) can be connected via a detachable interface (38) to the bus line, said interface (38) having a first connection (42) that is connected to a first section (12) of the bus line and a second connection (44) that is connected to a second section (14) of the bus line. To prevent an interruption of the bus line when the interface (38) is free, a bypass device (40) automatically creates a connection between the first section (12) of the bus line and the second section (14) of the bus line, if no electronic device (36) is connected to the interface (38).

6 Claims, 2 Drawing Sheets

BUS SYSTEM FOR AN AGRICULTURAL VEHICLE

BACKGROUND OF THE INVENTION

The invention pertains to a bus system, with a bus line, to which electronic devices can be connected, wherein at least one electronic device can be connected to the bus line at a separable interface, wherein the interface contains a first and second terminal connection in the motor vehicle, and wherein the first terminal connection is connected to a first section of the bus line and the second terminal connection is connected to a second section of the bus line.

DE 196 24 027 A describes an on-board computer system for machines which comprises a detachable on-board computer with memory, input devices and display devices.

EP 0 203 662 A describes a communication system for transmitting electronic messages between an agricultural machine and a tractor, wherein said communication system contains a bus in the form of a line. Electronic controllers for controlled devices, display devices and sensors are respectively connected to the bus via assigned terminal units. The bus transmits the data in serial form.

Today, bus systems of this type are usually realized in the form of so-called CAN.buses. They contain a continuous bus line, at both ends of which one respective matching resistor is arranged. All controlling and controlled controllers of the connected devices are connected to the bus line. The CAN specification allows only feeders with a length of 1 m between the backbone and the connected devices or controllers. The agricultural interpretation according to ISO 11783 also prescribes feeders with a length of only 1 m. This means that the bus line must extend into the vicinity of the plug of the connected devices or controllers. Consequently, the bus line runs twice in many sections of the wiring, namely from the main cable harness to the device plug and back again.

In instances in which a detachable device should be connected to the bus line, the above-mentioned standard stipulates the utilization of a plug connector, wherein the bus line is cut in the vicinity of the device (e.g., underneath the cabin console) and expanded with a T-shaped wiring arrangement. In this T-shaped wiring arrangement, the bus line extends from the backbone to a second plug connection, to which the device can be connected, via a first plug connection. The bus line then extends from the second plug connection to a third plug connection where it is connected to the backbone again. In order to observe the specifications of the above-mentioned standard with respect to the length of the feeders, the two sections of the bus line must extend through the second plug connection. The connection between the two sections of the bus line is formed by the cable that is connected to the device and must be connected to the plug connection (or in the device). When the device is disconnected, it is necessary to produce a connection between the two sections of the bus line in order to prevent an interruption of the bus line. A suitable plug is provided for this purpose.

In this respect, it is disadvantageous that when connecting and disconnecting the device, the bus line is interrupted during the time in which no plug is located in the plug connection. The bus line is not functional when the device is disconnected and no plug is provided for producing the connection between the sections of the bus line.

BRIEF SUMMARY OF THE INVENTION

The invention is based on the objective of making available an improved bus system in which the function of the bus line is also ensured when the device is disconnected.

According to the invention, this objective is realized with the characteristics of claim 1, with the subordinate claims disclosing characteristics for realizing advantageous additional refinements of the invention.

The invention pertains to a bus system of the initially described type. Two sections of the bus line extend through a separable interface that serves for connecting an electronic device in the form of an appliance, a switchbox, a terminal, a controller or the like in a detachable fashion. The two sections of the bus line are connected on the side of the interface which faces the electronic device when an electronic device is connected to the interface. In order to prevent the first section of the bus line from being separated from the second section of the bus line when no device is connected to the interface, the invention proposes a bypass device (in the motor vehicle) which automatically produces a connection between the first section and the second section of the bus line when the interface is not in use, i.e., when no electronic device is connected to the interface. The bypass device is correspondingly controlled if the interface is not in use and connects the two sections of the bus line to one another. If an electronic device is connected to the interface, the bypass device automatically separates the connection between the two sections of the bus line. It should be emphasized that the two connections of the interface which are connected to one section of the bus line do not have to be combined in one plug connection or the like. The interface may also contain two separate plugs or the like. The bypass device then separates the connection between the first section and the second section of the bus line if both plugs are connected to the interface.

Due to this measure, interruption of the bus line is prevented when no electronic device is connected to the interface. It is no longer necessary to arrange a plug on the interface for restoring the bus connection when the electronic device is disconnected.

The bypass device preferably contains an electronically controlled switch that is designed for connecting the first section of the bus line to the second section of the bus line. The switch may be realized in the form of a relay or with other electronic switching means, e.g., transistors or the like. This switch is controlled by the interface for the electronic device. In this case, the status of the interface can be determined mechanically, wherein a plug that is inserted into the interface mechanically opens or closes a contact in order to control the switch. However, it would also be conceivable to determine the status of the interface electronically, for example, by means of an inductive proximity switch. According to the invention, it is preferred to control the switch electronically via the interface. A contact on the interface which is assigned to the switch is only connected to a certain potential, for example, ground potential or the operating voltage, when an electronic device is connected to the interface. The switch then connects or separates the first section and the second section of the bus line in accordance with the potential of the contact assigned to the switch.

The bypass device usually is arranged relatively close to the interface so as to maintain the length of the free feeders to the interface within the range defined by the above-mentioned standard. If the bypass device is arranged farther from the interface, the bus lines between the bypass device and the interface can be automatically separated from the remaining bus by the bypass device so as to prevent undesirable interferences of the bus line.

The bus line transmits, in particular, electrical signals. However, it would also be conceivable to utilize an optical bus line.

One embodiment of the invention is described in greater detail below with reference to the figures. The figures show:

DETAILED DESCRIPTION OF THE INVENTION

Figure 1:
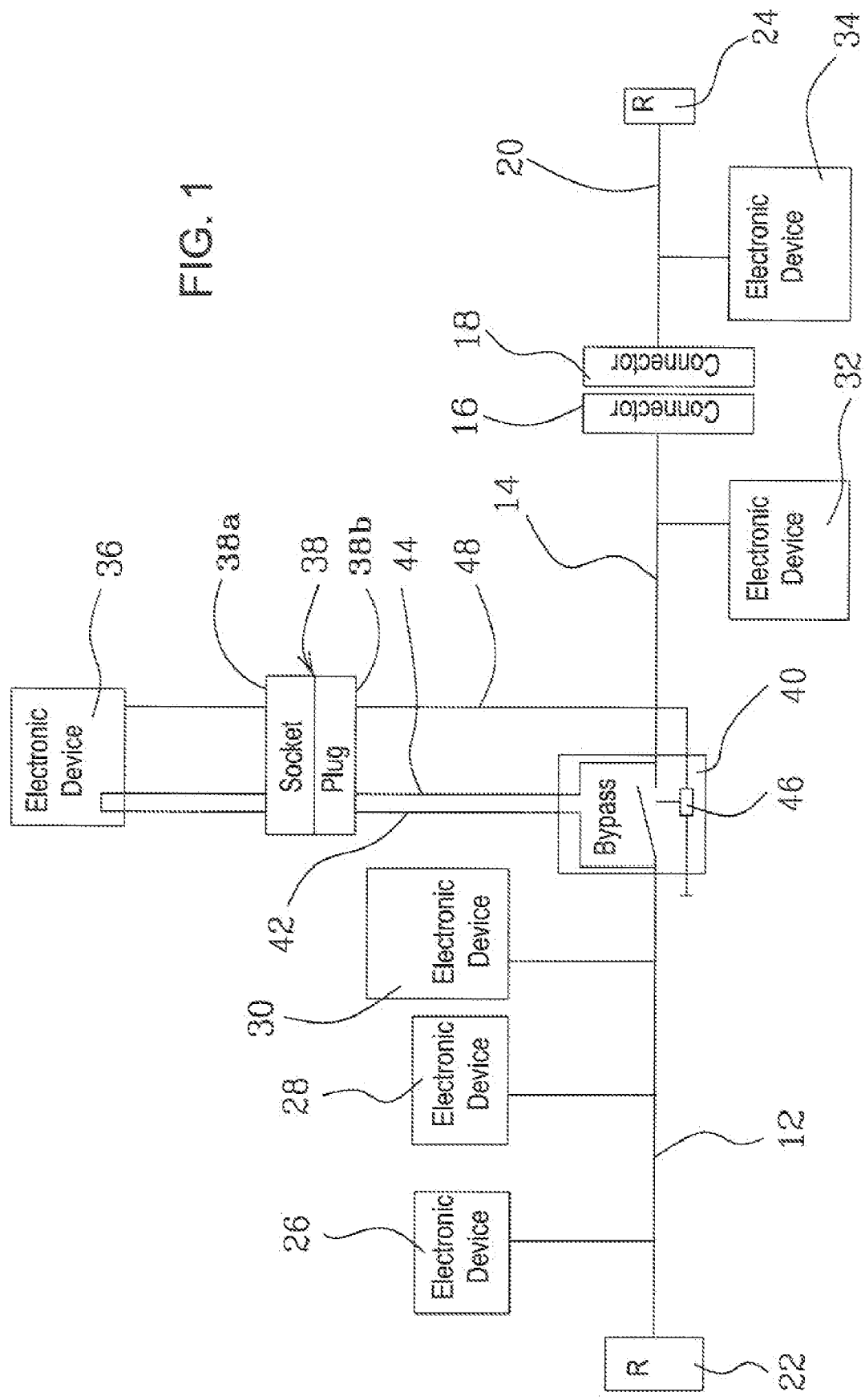
FIG. 1, a block diagram of a bus system, and
FIG. 2, a circuit diagram of a bypass device.

FIG. 1 shows a block diagram of a bus system according to the invention. This bus system contains a bus line that is composed of a first section 12 and a second section 14. The second section 14 of the bus line is connected to a third section 20 of the bus line via a plug connection that is composed of a first connector 16 in the form of a matching resistor that switches off automatically and a second connector 18. The bus line is terminated on its left end by a first matching resistor 22 and on its right end by a second matching resistor 24. In an agricultural vehicle, the first section 12 and the second section 14 of the bus line may be arranged on a motor vehicle (e.g., a tractor) and the third section 20 of the bus line may be arranged on an attached or towed device (e.g., a sprayer). Electronic devices 26–36 are connected to the bus line. The electronic devices 26–36 contain electronic controllers that communicate with one another in serial form via the bus line. The electronic devices are assigned to controlling devices (e.g., input devices), display devices (virtual terminal), controlled devices (e.g., spraying nozzles) or other electronic (control) devices. The bus line may consist of a multi-wire bus line. Bus systems of this type are generally known and, for example, specified in standard ISO 11783.

An electronic device 36 is detachably connected to the bus system via an interface 38 in the form of a plug connection consisting of a plug and socket. The first section 12 and the second section 14 of the bus line are each connected to the interface 38 via a bypass device 40. The interface 38 contains a first connection 42 that is connected to the first section 12 of the bus line and a second connection 44 that is connected to the second section of the bus line. The first section 12 and the second section 14 of the bus line run to the electronic device 36, where (or in the vicinity of which) they are connected to one another via the interface. This means that the bus line is connected through the interface to the electronic device 36. If the electronic device 36 is disconnected from the interface 38 and no devices are connected to the interface 38, the bus line is interrupted at this location. According to the state of the art, a corresponding plug must be arranged on the interface 38 for electrically connecting the first section 42 and the second section 44 to one another when the electronic device is disconnected.

The bypass device 40 is equipped with a switch 46 in the form of a relay. If a voltage is applied to a line 48 that is connected to the interface 38 as shown in FIG. 1, the switch 46 that is designed for connecting the first section 12 and the second section 14 of the bus line to one another is open. This means that the first section 12 and the second section 14 are not connected to one another by the switch 46. The line 48 is supplied with an electric voltage (e.g. +12 V) by a contact of the interface 38 which is assigned to this line. If the interface 38 is separated when the electronic device 36 is detached, a voltage is no longer applied to the line 48 and the switch 46 closes. This causes the first section 12 and the second section 14 of the bus line to be automatically connected to one another such that the bus line also operates flawlessly when the electronic device 36 is detached from the interface 38.

Figure 2:
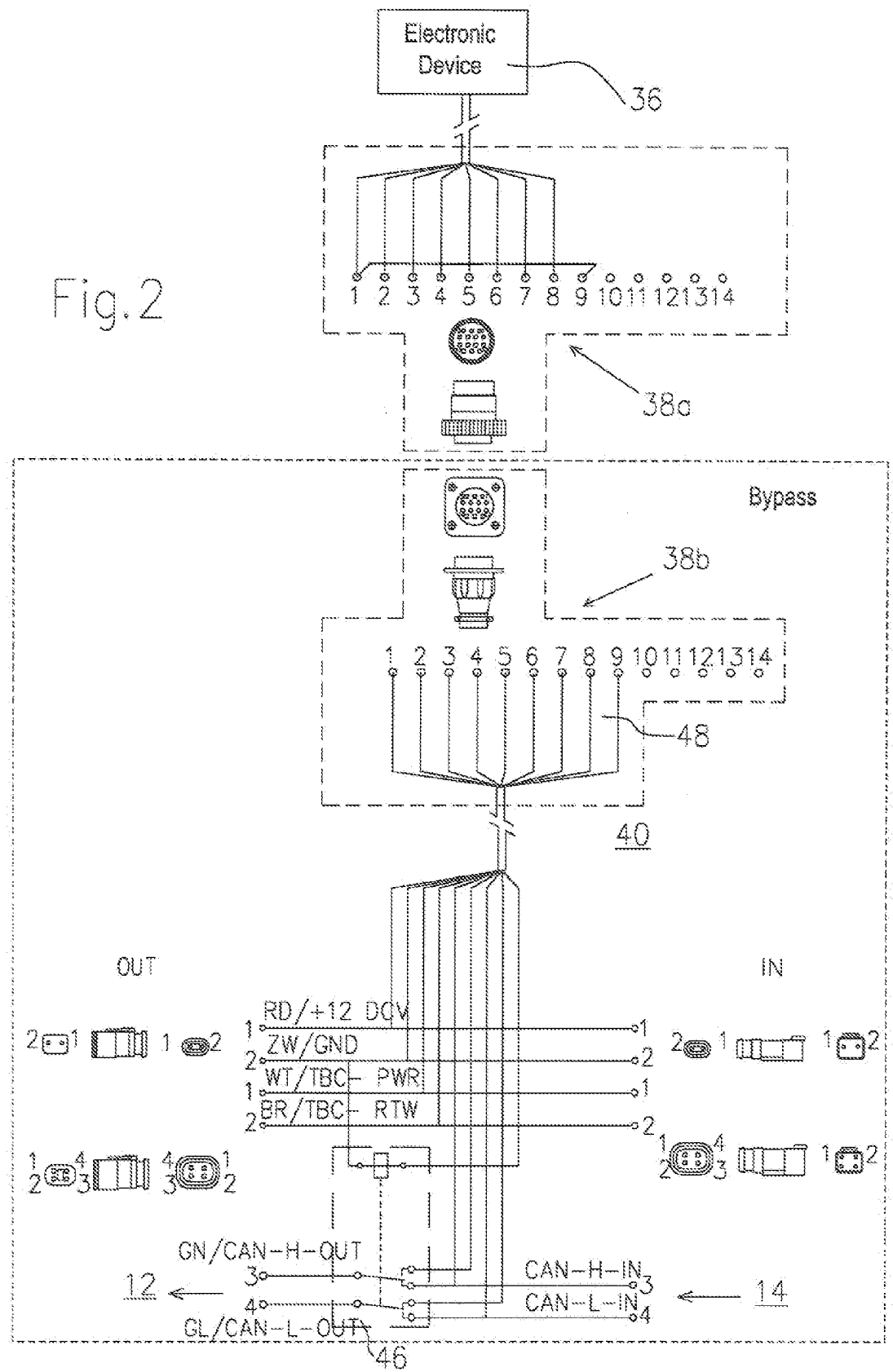

FIG. 2 shows an embodiment of the bypass device 40 for a CAN.bus. This bypass device contains an interface 38 in the form of a plug 38b (for the user station according to the LBS standard), into which a coupler 38a that is electrically connected to the electronic device 36 can be inserted. The bypass device 40 is connected to the two sections 12 and 14 of the (two-channel) bus line by plug connections, with said bus line comprising two data channels (CAN H and CAN L) and two power supply lines (TBC-PWR and TBC-RTW). In addition, the bypass device 40 is connected to a power supply line (+12 VDC and GRD) installed in parallel with the bus line via a plug connection, with said power supply line, as well as the power supply channels of the bus line, being connected through the bypass device 40. This means that the bypass device 40 can be disconnected and removed from the bus line. However, it would also be conceivable to permanently connect the bypass device to the bus line and/or the power supply line, as indicated in FIG. 1.

The plug 38b of the interface 38 contains contacts, wherein one respective contact is connected to the power supply lines and to the data channels of the first section 12 and the second section 14 of the bus line. The line 48 for controlling the switch 46 that is realized in the form of a relay is connected to a contact of the plug 38b, with said contact being connected to +12 V via the corresponding contact of the coupler 38a if the plug 38b and the coupler 38a are connected to one another. In this way, the contacts of the switch connect the data channels of the first section of the bus line 12 to the data channels of the second section of the bus line 14 when the plug 38b and the coupler 38a are not connected to one another as shown in FIG. 2. Otherwise, the switch 46 is open and the bus line conventionally extends through the interface 38. As with the data channels, the power supply lines of the bus line may also run through the interface 38 so that they can be changed over.

What is claimed is:

1. Bus system, containing a bus line having a first section (12), to which first electronic devices (26–30) can be connected, and a second section (14) to which second electronic devices (32–34) can be connected, wherein at least one electronic device (36) can be connected to the bus line at a separable interface (38) between the first section (12) and the second section (14), wherein the interface (38) contains a first connection (42) and a second connection (44) of a motor vehicle, and wherein the first connection (42) is connected to the first section (12) of the bus line and the second connection (44) is connected to the second section (14) of the bus line, and a bypass device (40) including an electronically controlled switch (46), wherein the electronically controlled switch automatically produces a connection between the first section (12) of the bus line and the second section (14) of the bus line if the electronic device (36) is disconnected from the interface (38) to prevent an interruption of the bus line, and wherein the first and second sections (12, 14) of the bus line are connected through the interface (38) when the electronic device (36) is connected to the interface (38), the connection between the first section (12) of the bus line and the second section (14) of the bus line being maintained both if the electronic device (36) disconnected from or connected to the interface and wherein the bus line comprises a CAN bus transmitting electrical signals.

2. Bus system according to claim 1, characterized by the fact that the electronically controlled switch (46) of the bypass device (40) is switchable between open and closed positions between the first section (12) and the second section (14) of the bus line, and the electronically controlled switch switches to the open position if an electronic device (36) is connected to the interface (38).

3. Bus system according to claim 1 characterized by the fact that the electronically controlled switch (46) comprises a relay, wherein said relay is designed for connecting the first section (12) and the second section (14) of the bus line, and by the fact that the switch (46) is controlled by the interface (38).

4. Bus system according to claim 3, characterized by the fact that the switch (46) is controlled by the interface (38) in an electrical electromechanical or mechanical fashion.

5. Bus system according to claim 4 characterized by the fact that the bypass device (40) is arranged close to the interface (38).

6. Bus system according to claim 1 wherein the motor vehicle comprises an agricultural vehicle.

* * * * *